United States Patent [19]

Brownlie et al.

[11] Patent Number: 5,493,586

[45] Date of Patent: Feb. 20, 1996

[54] TCM SCHEME WITH FRACTIONAL BIT RATES, FRAMING SIGNALS AND CONSTELLATION SHAPING

[75] Inventors: John D. Brownlie, Woodbridge; Richard G. C. Williams, Ipswich, both of England

[73] Assignee: British Telecommunications public limited company, London, England

[21] Appl. No.: 122,524

[22] PCT Filed: Mar. 27, 1992

[86] PCT No.: PCT/GB92/00562

§ 371 Date: Dec. 1, 1993

§ 102(e) Date: Dec. 1, 1993

[87] PCT Pub. No.: WO92/17971

PCT Pub. Date: Oct. 15, 1992

[30] Foreign Application Priority Data

Mar. 28, 1991 [GB] United Kingdom .................. 9106658
Apr. 26, 1991 [GB] United Kingdom .................. 9109006
Jun. 7, 1991 [GB] United Kingdom .................. 9112316

[51] Int. Cl.⁶ .............................. H04L 5/12; H04L 23/02
[52] U.S. Cl. .......................... 375/265; 375/261; 375/298
[58] Field of Search .................................. 375/39, 59, 17, 375/286, 261, 262, 264, 265, 298; 371/37.1, 43; 332/103

[56] References Cited

U.S. PATENT DOCUMENTS

| 4,713,817 | 12/1987 | Wei | 375/39 |
|---|---|---|---|
| 4,837,766 | 6/1989 | Yoshida | 371/46 |
| 5,150,381 | 9/1992 | Forney, Jr. et al. | 375/49 |
| 5,214,672 | 5/1993 | Eyuboglu et al. | 375/39 |

FOREIGN PATENT DOCUMENTS

| 0122305 | 10/1984 | European Pat. Off. . |
|---|---|---|
| 0383632 | 8/1990 | European Pat. Off. . |
| 0392723 | 10/1990 | European Pat. Off. . |

OTHER PUBLICATIONS

Calderbank et al, "Nonequiprobable Signaling on the Gaussian Channel", IEEE Transactions on Information Theory 36 (1990) Jul., No. 4, New York, US, pp. 726–740.

Forney, Jr., "Multidimensional Constellations—Part I: Introduction, Figures of Merit, and Generalized Cross Constellations", IEEE Jornal on Selected Areas in Communication, vol. SAC-7, No. 6, Aug. 1989, New York US, pp. 877–892.

Forney, "Multidimensional Constellations—Part II: Voronoi Constellations", IEEE Journal on Selected Areas in Communication, vol. SAC-7, No. 6, Aug. 1989, New York US, pp. 941–958.

Forney, Jr., "Trellis Shaping" IEEE Transactions on Information Theory, vol. 38, No. 2, Mar. 1992, pp. 281–300.

Primary Examiner—Stephen Chin
Assistant Examiner—Don Vo
Attorney, Agent, or Firm—Nixon & Vanderhye

[57] ABSTRACT

Data are transmitted using quadrature amplitude modulation to select for transmission symbols from two (or more) different signal point constellations; constellation switching being used to facilitate transmission of a non-integral average number of bits per symbol and/or frame synchronization. Trellis shaping (where redundancy is introduced and selection of constellation "regions" performed over a number of symbols so as to minimize transmitted power) is employed; switching is provided so that power information (from stores is available appropriate to the constellation in use for each respective symbol. Synchronization may alternatively be provided by substitution outside the power control loop, of a symbol from an outer region for one selected from an inner region of a constellation. In another aspect of the invention, constellation-switching is employed within frames of A symbols, where A is not a power of two.

18 Claims, 10 Drawing Sheets

16 POINT SIGNAL CONSTELLATION

| | | | | | | | |
|---|---|---|---|---|---|---|---|
| 3 | 3 | 2 | 2 | 2 | 2 | 3 | 3 |
| 3 | 3 | 1 | 1 | 1 | 1 | 3 | 3 |
| 2 | 1 | 0 | 0 | 0 | 0 | 1 | 2 |
| 2 | 1 | 0 | 0 | 0 | 0 | 1 | 2 |
| 2 | 1 | 0 | 0 | 0 | 0 | 1 | 2 |
| 2 | 1 | 0 | 0 | 0 | 0 | 1 | 2 |
| 3 | 3 | 1 | 1 | 1 | 1 | 3 | 3 |
| 3 | 3 | 2 | 2 | 2 | 2 | 3 | 3 |

Fig. 10

|   |   | 3 | 3 | 3 | 3 | 3 | 3 | 3 | 3 |   |   |
|---|---|---|---|---|---|---|---|---|---|---|---|
|   |   | 2 | 2 | 2 | 2 | 2 | 2 | 2 | 2 |   |   |
| 3 | 2 | 1 | 1 | 1 | 1 | 1 | 1 | 1 | 1 | 2 | 3 |
| 3 | 2 | 1 | 1 | 0 | 0 | 0 | 0 | 1 | 1 | 2 | 3 |
| 3 | 2 | 1 | 0 | 0 | 0 | 0 | 0 | 0 | 1 | 2 | 3 |
| 3 | 2 | 1 | 0 | 0 | 0 | 0 | 0 | 0 | 1 | 2 | 3 |
| 3 | 2 | 1 | 0 | 0 | 0 | 0 | 0 | 0 | 1 | 2 | 3 |
| 3 | 2 | 1 | 0 | 0 | 0 | 0 | 0 | 0 | 1 | 2 | 3 |
| 3 | 2 | 1 | 1 | 0 | 0 | 0 | 0 | 1 | 1 | 2 | 3 |
| 3 | 2 | 1 | 1 | 1 | 1 | 1 | 1 | 1 | 1 | 2 | 3 |
|   |   | 2 | 2 | 2 | 2 | 2 | 2 | 2 | 2 |   |   |
|   |   | 3 | 3 | 3 | 3 | 3 | 3 | 3 | 3 |   |   |

Fig. 11

| b | a | b | a |
|---|---|---|---|
| c | d | c | d |
| b | a | b | a |
| c | d | c | d |

TCM SCHEME WITH FRACTIONAL BIT RATES, FRAMING SIGNALS AND CONSTELLATION SHAPING

BACKGROUND OF THE INVENTION

1. Field of the Invention

The present invention relates to data transmission in which a sequence of symbols, viz. signals of selectable phase and amplitude are selected from a range of discrete phase/amplitude combinations.

2. Description of the Prior Art

Examples of prior systems capable of transmitting fractional bits/baud and/or for modulation shaping a sequence of symbols of selectable amplitude and phase so as to control average power of transmitted signals are described, for example, in U.S. Pat. No. 5,214,672—Eyuboglu et al and U.S. Pat. No. 5,150,381—Forney, Jr., et al.

Prior art techniques have included quadrature amplitude modulation (QAM) where groups of q bits are assembled and one or more bit in each group is coded (e.g. by a convolutional or block code) to produce an augmented group having at least q+1 bits. For each such augmented group, a symbol is selected for transmission from a signal point constellation having more than $2^q$ points using a variable mapping controlled by generating, for each augmented group, power signals representing the signal power corresponding to each of a plurality of alternative mappings of the group. Such power signals are decoded by a Viterbi decoder to determine a mapping for that group that substantially minimizes the time averaged power of the transmitted signals.

BRIEF SUMMARY OF THE INVENTION

In one exemplary embodiment of the invention, such a system is improved by making the number of bits q per group repetitively variable and then choosing, according to the value of q, the signal constellation and mapping associated therewith so that the power signals are generated by and in response to a signal ts indicative of the value of q and to stored information defining the mappings to produce power signals corresponding to the mappings associated with the chosen constellation.

In one embodiment having enhanced frame synchronicity features, the constellation may include a plurality of subgroups of points with a first variable mapping being used for a symbol at a predetermined position within each transmitted frame and a second variable mapping is used for the remaining symbols in each frame. The first variable mapping permits selection of a symbol from a subgroup having a larger mean power than the remaining subgroups and the second mapping not permitting selection of a symbol from that subgroup having larger mean power.

Alternatively for enhanced frame synchronicity, at a predetermined position within each frame, whenever a symbol from one predetermined group is selected for that position, a symbol from an additional subgroup is actually transmitted instead.

This invention provides a QAM technique for use wherein the number of bits per symbol is a rational non-integer greater than unity when expressed as a ratio B/A of two integers having no common factor, A not being a power of two and each group of B bits is transmitted by means of A–d symbols where d is an integer less than A and greater than or equal to one, each chosen from a first symbol point constellation and d symbols each chosen from a second, larger signal point constellation.

The invention in its various aspects is further defined in the claims.

BRIEF DESCRIPTION OF THE DRAWINGS

Some embodiments of the present invention will now be described, by way of example, with reference to the accompanying drawings, in which:

FIG. 10 is a phase diagram showing division of a 128-point constellation into regions;

FIG. 11 is a phase diagram illustrating division of a constellation into four subsets.

Figure 13:
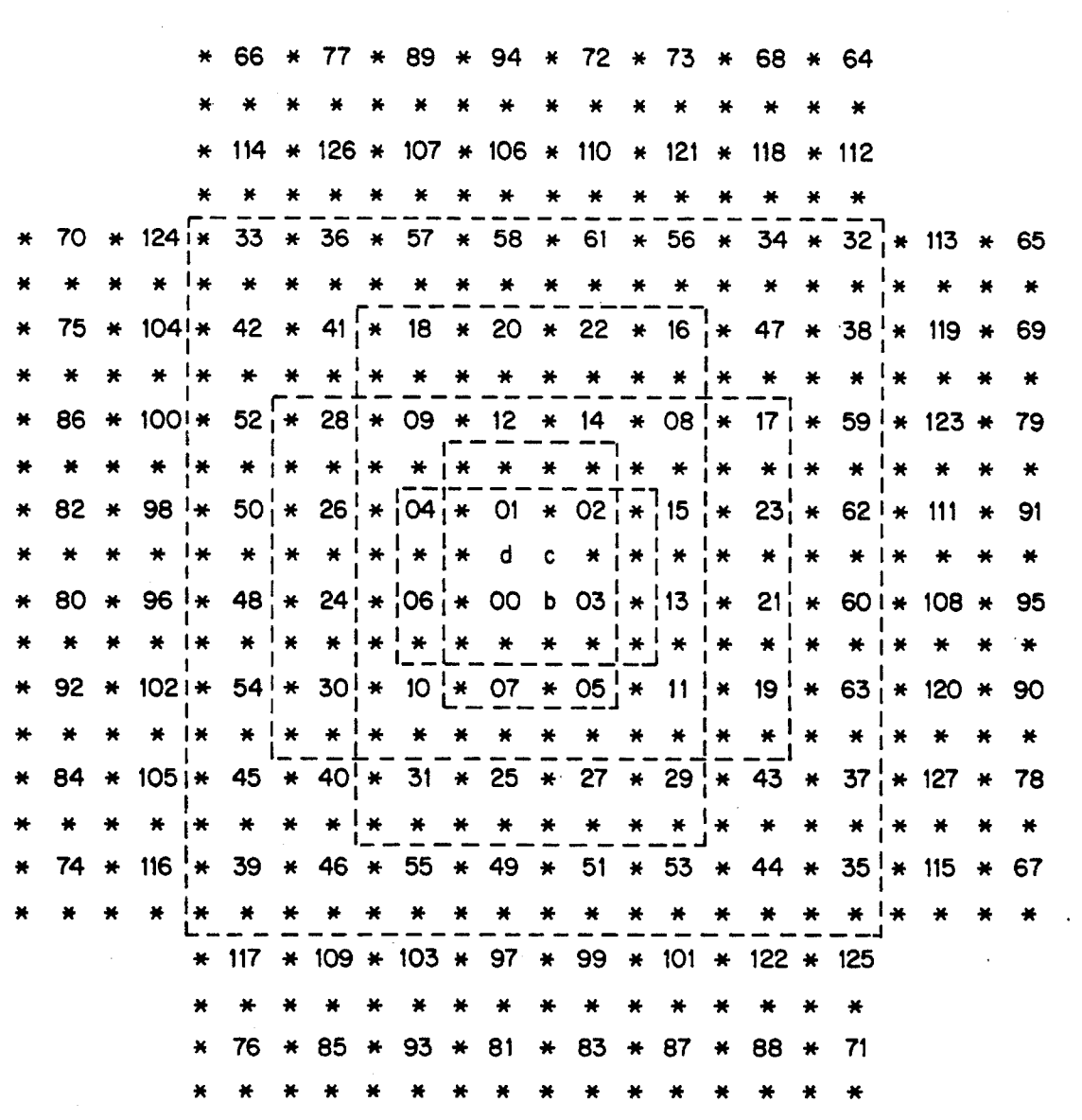

FIGS. 13 and 14 are phase diagrams illustrating nested constellations and their labelling.

DETAILED DESCRIPTION OF EXEMPLARY EMBODIMENTS OF THE INVENTION

I. Switched Constellations

Figure 1:
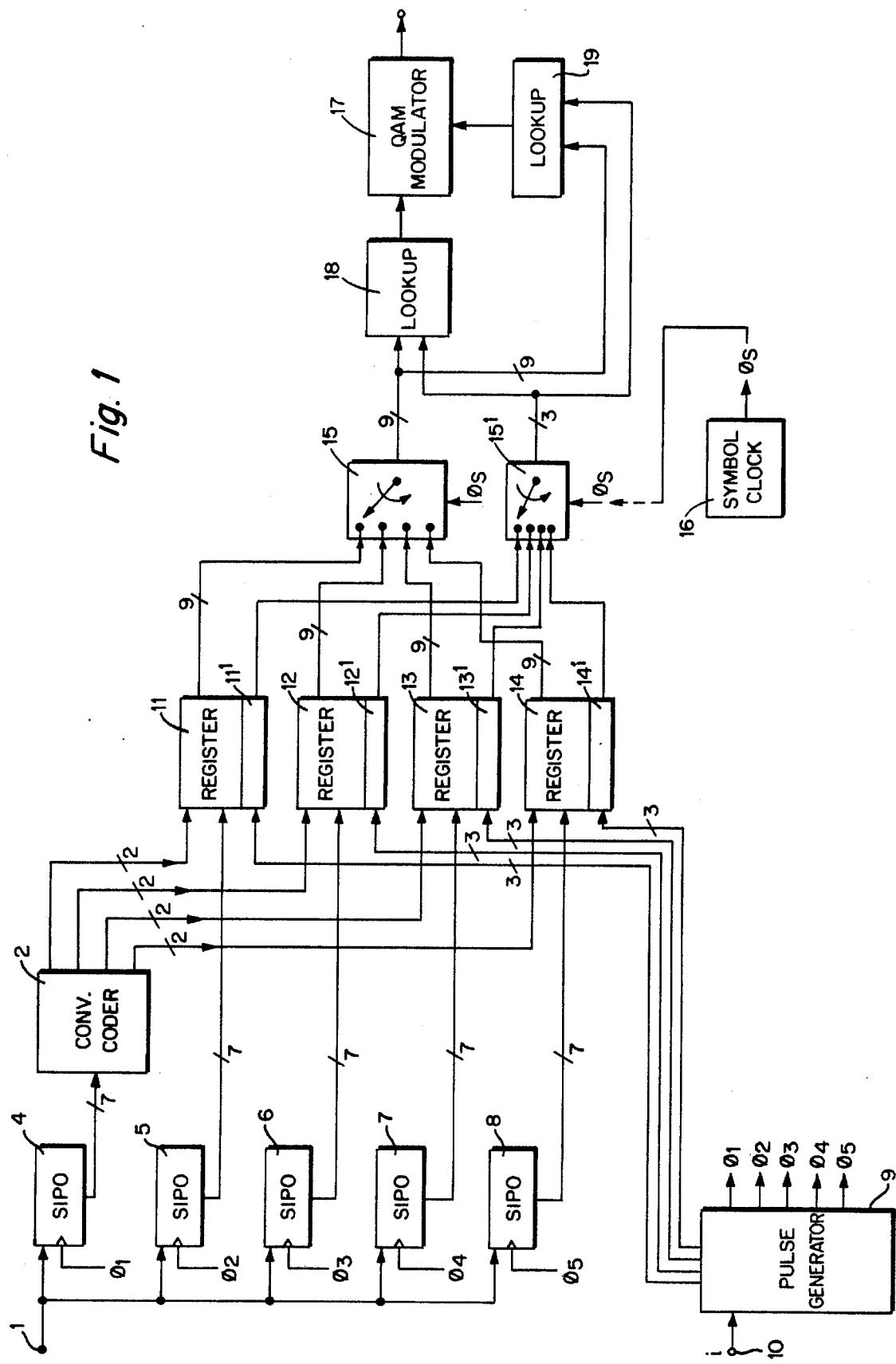
FIG. 1 is a block diagram of one form of coding apparatus according to the invention.

FIG. 1 shows a modulator for digital signals, using quadrature amplitude modulation (QAM). It is switchable between a number of different data rates each of which is a multiple of some base rate; a base rate of 2400 bit/s is assumed, though the actual choice does not affect the principles involved. Thus, at any time, data is received at an input 1 at a rate of i.2400 bits/second. Typically the values of i at which the modulator is capable of operating are in the range 1≦i≦10 though in principle there is not limit to i. The modulator generates an output signal consisting of QAM symbols at a symbol rate of some rational multiple of the base rate i.e. 2400 a/b (=1/T) where a and b are integers. The average number of data bits per symbol is ib/a. Conversely, the symbol rate is a/bi times the data rate.

A common method of improving the error performance of such digital signals is to make available a larger choice of QAM symbols than is necessary to carry the data. For example if a $2^{m+1}$-point QAM constellation is available for transmitting m data bits per symbol then the latter can be coded using an error-correcting code (e.g. by means of a convolutional coder) and a decoder can make use of the fact that not all symbol sequences are allowable by recognising non-allowable sequences as indicative of transmission errors and hence correcting at least some of the errors by finding the nearest allowable sequence. A coding overhead (i.e. redundancy) is needed for modulation coding. It is quite common to use one coding (redundant) bit per QAM symbol, so that a $2^{m+1}$-point constellation is needed for transmitting m data bits per symbol. To achieve a smaller expansion than this (i.e. with a coding overhead of less than one bit per symbol) the symbols can be assembled into groups of c symbols which together carry one coding bit (or, more generally, j coding bits), so that the number of possible symbol sequences in a period cT is $2^{cm+j}$. These groups are commonly referred to as multidimensional symbols but, for clarity, in this description the term "symbol" is used to refer to a single QAM symbol. Thus, if the same constellation is used for all symbols, then the number of points per constellation x is $x=2^{m+j/c}$. Although each QAM symbol carries 2 signal dimension, it is possible to use modulation coding which requires one coding bit over an odd number of signal dimensions; e.g. if one coding bit is needed for 3 signal dimension, then we set c=3 and j=2. Also, PAM (baseband) systems can be included if we reinterpret each 'QAM symbol' as a pair of PAM symbols at amplitudes equal to the two 'QAM symbol' coordinates.

In general, however, it is not easy to devise sets of satisfactory QAM constellations each having an arbitrary number of points and we prefer therefore to use constellations having a number of points equal to a power of 2; the desired number of symbol sequence combinations in then achieved by switching between two constellations.

Thus, at a data rate i×2400 and a symbol rate 1/T=(a/b)× 2400 the number of data bits per symbol group is cib/a and hence the total number of bits per symbol group is cib/a+j. In general, this is not an integer so we consider intervals AT containing A symbols, where A is the lowest common multiple of a and c. The total number of bits per A symbols is then B=ibA/a+jA/c where the first term is the number of data bits and the second the number of coding bits. The code rate (ratio of the number of data bits to total bits is ibA/ a(ibA/a+jA/c).

If k is the largest integer for which kA<B, and d the remainder (i.e. B=kA+d) then the total of B bits can be mapped onto A−d QAM symbols chosen from a $2^k$-point constellation and d QAM symbols chosen from a $2^{k+1}$-point constellation. Obviously a value for d can likewise be derived for other pairs of constellations. Note that the minimum separation between points should for optimum performance be the same for the two constellations used.

The use of two constellations in this way, rather than a single constellation results in a small reduction in the noise immunity for a given transmitted power (although this may be rectified by measures to be discussed later) but provides the flexibility not provided by a single constellation to enable operation over the range of data rates discussed. It also provides flexibility on selection of the symbol rate which may be chosen so as to maximise utilisation of the available channel bandwidth whilst enabling standard data rates. The method may of course be employed without the use of convolutional or other coding. In that instance we set j=0 and c=1.

Suppose that it is desired to transmit at data rates of i×2400, employing a symbol rate of 2800 symbol/s, and that c and j are selected to be 4 and 1 respectively. Then a=7; b=6; c=4; A=28; B=24i+7.

E.g. for a data rate of 8×2400=19200 bit/s one needs to select 25 QAM symbols on a 128-point constellation and 3 QAM symbols on a larger 256-point constellation.

The number of bits per A (=28) symbols is ibA/a=24i data bits plus jA/c=7 coding bits. The task of the coder is to:

(a) generate the 7 coding bits;
(b) use the 24i+7 bits to control a QAM modulator to generate the required symbols.

Firstly it should be noted that it is not necessary (indeed it is not usual in convolutionally coded QAM systems) that all 24i data bits participate in the convolutional coding. In the coder of FIG. 1 (for which the numbers of signal lines shown correspond to i=5) three data bits per symbol group (i.e. 21 over the period AT) are convolutionally coded by a ¾ rate convolutional coder 2 (of conventional construction). The four output bits from this coder specify one of 16 subsets over c (=4) symbols (i.e. one of the 16 4T-subsets). Each cT subset comprises a set of permutations of single-symbol subsets (i.e. T-subsets). For example good distance properties within and between cT-subsets can be obtained by constructing them from four T-subsets, which may be labelled 0 1 2 and 3. Then, for example with c=4, the zeroth 4T-subset may comprise the 16 T-subset permutations:

| | | | |
|---|---|---|---|
| 0000 | 0022 | 0202 | 0220 |
| 1111 | 1133 | 1313 | 1331 |
| 2222 | 2200 | 2020 | 2002 |
| 3333 | 3311 | 3131 | 3113 |

As all the input bits are of equal status it does not matter which 21 bits are chosen—hence the description of the manner in which the input bits are distributed is merely a convenient example. However, these 21 bits must be used correctly in the QAM process to ensure that a coding gain is achieved. The description also assumes that, during the period AT, the (A−d) symbols chosen from the smaller constellation are transmitted first, followed by the d symbols chosen from the larger constellation, but actually the sequence is (in this embodiment) immaterial, except that it clearly maximises the peak power duration and if this exceeds the limit of the channel that is to be used it may be necessary to distribute the "larger" symbols throughout the period.

Suppose that the data rate is 5×2400=12000 bit/s. k=4, so that constellations with $2^4$=16 and $2^5$ =32 points are used. The 120 bits of data during the period AT are used to generate 13 "small" symbols and 15 large ones, as follows:

| 3 bits | convolutional coding | 4 bits | 1st, 2nd |
|---|---|---|---|
| 4 bits | to choose signal sets | 4 bits | & 3rd |
| 8 bits | uncoded | 8 bits | groups of |
| | | | 4 symbols |
| | | 3 × 16 bits | (small) |
| 3 bits | convolutional coding | 4 bits | 4th |
| 4 bits | to choose signal sets | 4 bits | group 1 |
| 11 bits | uncoded | 11 bits | small |
| | | | symbol @ |
| | | 19 bits | 4 bits |

| Then for | i = | 1, | 2, | 3, | 4, | 5, | 6, | 7, | 8, | 9, | 10 |
|---|---|---|---|---|---|---|---|---|---|---|---|
| We have | B = | 31, | 55, | 79, | 103, | 127, | 151, | 175, | 199, | 223, | 247 |
| | k = | 1, | 1, | 2, | 3, | 4, | 5, | 6, | 7, | 7, | 8 |
| | d = | 3, | 27, | 23, | 19, | 15, | 11, | 7, | 3, | 27, | 23 |

|         |                         |         | 3 large symbols @ 5 bits |
|---------|-------------------------|---------|--------------------------|
| 3 bits  | convolutional coding    | 4 bits  | 5th–7th                  |
| 4 bits  | to choose signal sets   | 4 bits  | groups                   |
| 12 bits | uncoded                 | 12 bits | 4 large symbols          |
|         |                         | 3 × 20 bits | @ 5 bits             |

In FIG. 1, data bits received at an input 1 are distributed to selected ones of five serial-in/parallel-out registers 4–8, so as to assemble data bits for constructing a single symbol group. Each has a length of 7 bits. For this purpose the registers are clocked by i.2400 Hz clock pulses $\phi_1 \ldots \phi_5$ from a pulse generator 9 whose operation depends on the currently selected data rate. This generator operates in regular cycles of duration AT, within which it runs through seven sub-cycles of different lengths.

Figure 2:
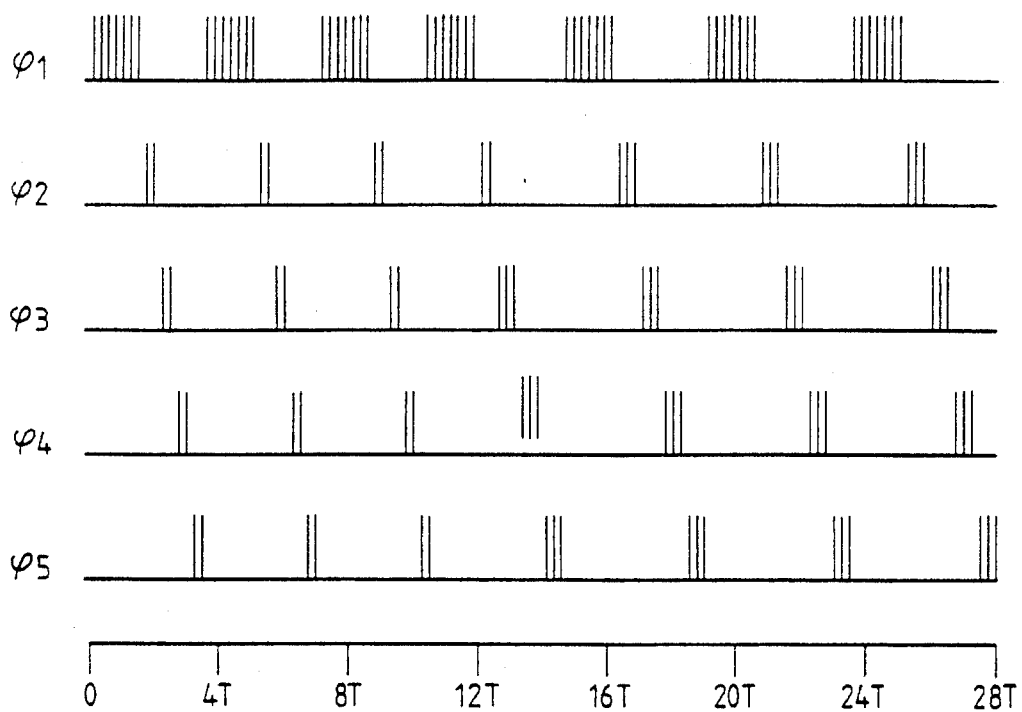
FIG. 2 is a timing diagram for the apparatus of FIG. 1.

For the 12000 bit/s case, the first to third sub-cycles each consist (as shown in FIG. 2) of, in succession, 7 pulses $\phi_1$ and 2 pulses each $\phi_2 \ldots \phi_5$. The fourth sub-cycle has 7 pulses $\phi_1$, 2 pulses $\phi_2$, and 3 pulses each $\phi_3$–$\phi_5$. The fifth to seventh sub-cycles have 7 pulses $\phi_1$ and groups of 3 pulses $\phi_2$–$\phi_5$ in each case. The total number of pulses is, of course, 120. It will be appreciated that each sub-cycle corresponds to a group of four QAM symbols and contains three $\phi_1$ pulses to select 3 data bits for the convolutional coder, (giving 4 bits) plus four $\phi_1$ pulses to give a total of 8 bits selecting the signal sets. The pulses $\phi_3$–$\phi_5$ are k–2 or k–1 in number, or a mixture of k–2 and k–1 according to whether the symbols in that group are to be chosen from the $2^k$ or $2^{k+1}$ constellations or a combination thereof. The pulse generator 9 has an input 10 to indicate the data rate, and thereby select the required pulse sequences. The total number of pulses in a complete cycle is 24×i. The 7 bits output from the register 4 feeds a convolutional coder 2 which produces an output of eight coded bits. These bits are derived from the seven input bits and one other. This other bit is determined by the state of the convolutional coder and three of the input bits. All eight bits are here referred to as "coded bits", irrespective of the operation of the convolutional coder 2, to distinguish them from the uncoded bits in registers 5 to 8.

The eight coded bits from the convolutional coder are appended in pairs to the k–2 bit or k–1 bit word stored in a respective one of the registers 5 to 8; the composite word is transferred to respective holding registers 11 to 14 by pulses $\phi'_2 \ldots \phi'_5$ occurring after pulses $\phi_2$, $\phi_3$ etc. These pulses also reset the registers 5 to 8 to ensure that whenever fewer than 7 bits are clocked into a register, the remaining (rightmost) bits are always zero.

The contents of the holding registers are selected in turn by a multiplexer 15 controlled by a symbol clock 16 producing regular pulses $\phi_S$. These are not in general synchronous with the data clock; a cycle AT contains 24i clock pulses and 28 symbol pulses.

Figure 3:
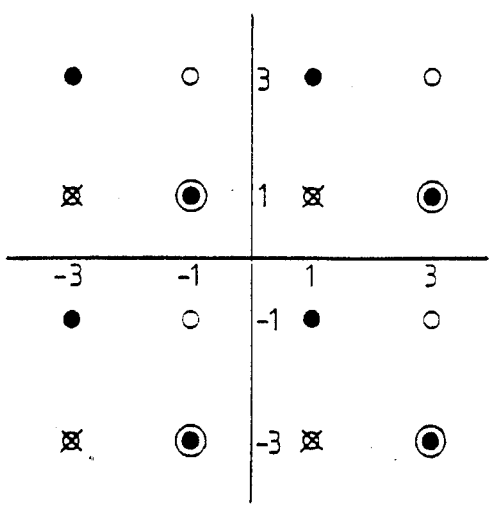
FIGS. 3 and 4 are phase diagrams showing respectively a 16-point and 32-point signal constellation.
Figures 4, 5:
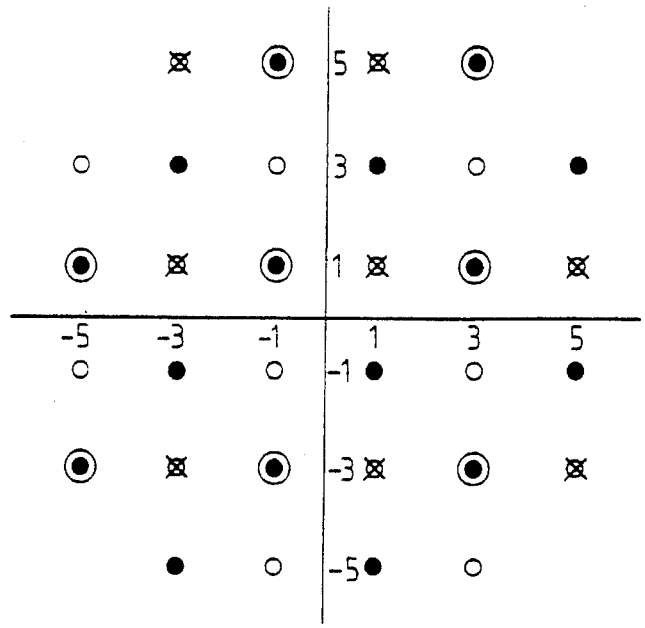
FIG. 5 is a phase diagram showing division of a 64-point constellation into regions.

The 9 bit words serve to control a QAM modulator 17. Suitable 16 and 32 point constellations for use at 12000 bit/s are shown in FIGS. 3 and 4. The relative mapping of the 4 and 5 bit words from the multiplexer 15 is determined by a pair of read-only memories 18, 19 each of which receives the word as the memory address and produces an output I, Q indicating to the modulator 17 the phase and quadrature components of the required point. Consider the 4-bit case first; the pair of coded bits must select one of the four subsets of the 16-point constellation distinguished by different shading in FIG. 3. The assignment of the four combinations of the remaining two bits is arbitrary. If, as here, the sixteen point constellation is contained in the 32-point constellation, then if the fifth bit is employed to select between the outer 16 or inner 16 points, then the same read-only memories can be used for both constellations; i.e. the modulator does not need to know whether, if the fifth bit is zero, this is because it is to transmit a point from the smaller constellation or because it is to transmit an inner point of the larger.

If such nested mapping is not employed for all data rates of interest, then the memories will need to be supplied with an additional three bits to indicate the constellation and mapping in use and enable switching to a different 'table' within the memory. Thus the pulse generator 9 is shown as supplying four such words (simultaneously) during each sub-cycle which are loaded into registers 11' etc alongside the registers 11–14 and passing via a multiplexer 15'.

The embodiment described with reference to FIG. 1 is arranged to accommodate a range of symbol rates by switching between a larger and a smaller signal point constellation each having a number of points equal to a power of two. As an alternative, however, it is possible to employ constellations having other numbers of points, with a resulting improvement in power.

As before, each group of A symbols consists of A–d symbols chosen from the smaller constellation and d chosen from the larger one. Suppose that the constellations have respectively $2^m$ points and $2^{m+1/h}$ points, where h is an integer power of two and m is either an integer or an integer divided by h. Then for B bits per A symbols, m and d are given by B=Am+d/h were 0<d<A.

In practice, inter alia because $2^m$ and $2^{m+1/h}$ are not both integers, it is necessary to use a somewhat larger constellation. In the case h=2 one would use, for m integer, $2^m$ and $1.5 \times 2^m$ points, and for m non integer $0.75 \times 2^{m+\frac{1}{2}}$ and $2^{m+\frac{1}{2}}$ points.

In the former case (m integer h=2) one proceeds as follows. A–d symbols are selected from the smaller constellation. The remaining d symbols are considered in pairs (or, in general, groups of h symbols). Note that as m is an integer, d is even. Each symbol is selected from the larger constellation but one (at most) of the pair is allowed to be chosen from the "outer" $2^{m-1}$ points not common to both constellations, and one or both symbols are chosen from the "inner" $2^m$ points. One information bit determines whether an outer symbol is to be used; if it is not then each symbol is selected from the inner $2^m$ points and therefore carries m information bits. A total of 2m+1 bits is carried by the pair. If an outer symbol is to be used then a second information bit selects which symbol of the pair it is to be. The two symbols are chosen from the outer $2^{m-1}$ and inner $2^m$ points and carry m–1 and m bits respectively; again the total rate per pair is 2m+1 bits.

Figure 14:
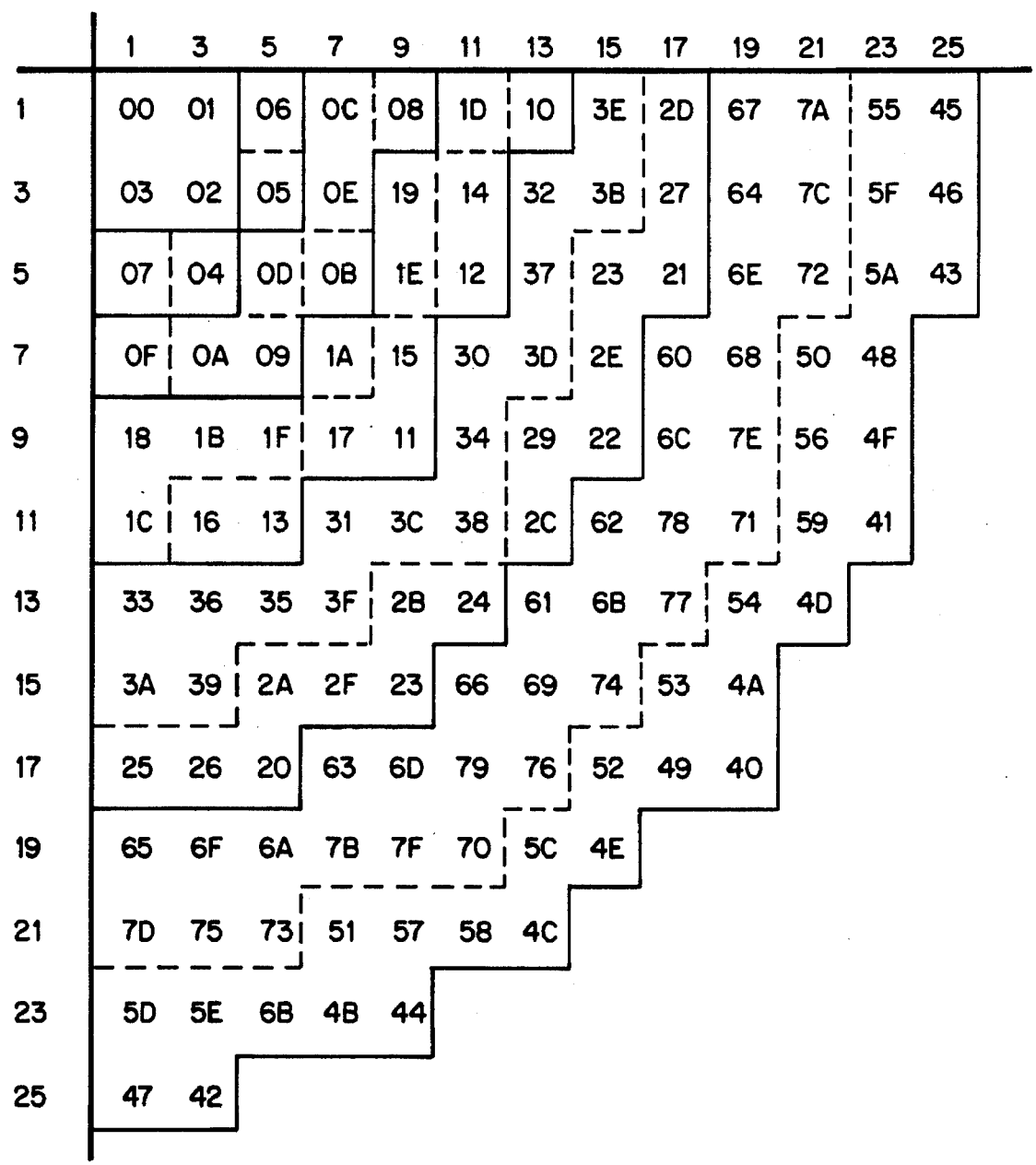

In the case where m is non-integer m+½ is an integer. The d symbols from the larger constellation carry m+½ bits each. A–d symbols are chosen from the smaller constellation. Note that as B=Am+d/2 then if S is odd then d is also odd and A–d is even: the A–d symbols are again considered in pairs and are coded onto the smaller, $0.75 \times 2^{m+\frac{1}{2}}$ point, constellation in the same manner as described above for selection of the d symbols from the larger constellation in the m integer case. In this instance the smaller constellation is regarded as containing $2^{m-\frac{1}{2}}$ inner points and $2^{m-1\frac{1}{2}}$ outer points.

Where unshaped constellation switching is used with $2^{k+\frac{1}{2}}$-point constellations (k integer), the constellations may be chosen from FIG. 14. The solid lines denote the boundaries of $2^k$ point constellations whilst the shaded/unshaded boundaries show the boundaries of $2^{k+\frac{1}{2}}$-point constellations.

II. Shaping

The embodiment of FIG. 1, though perfectly usable, does suffer from the disadvantage that the average transmitted power is increased (and hence the signal-to-noise performance inferior) compared with the (less convenient) approach of finding a suitable single signal constellation.

If the average power of a $2^k$-point constellation is P, then that of the $2^{k+1}$-point constellation is approximately 2P, therefore the average power of the signal produced by the coder of FIG. 1 is $[(A-d)P+2dP]/A=(1+d/A)P$. Had a single constellation been used then this would have had $2^m$ points where m is a non-integer between k and k+1. Theoretically $m=k+d/A$ (i.e. the number of bits per symbol) but will be larger ($m=k+d/A+\delta$) to ensure a convenient whole number of points. The power is approximately $$\frac{2^m P}{2^k} = 2^{(d/A+\delta)} \cdot P$$

The power increase is thus in the ratio $(1+d/A)/2^{(d/A+\delta)}$. As in practice $\delta$ is small this is usually greater than unity and has a maximum (i.e. worst-case value for $\delta=0$ and d/A=0.565) of 1.057 (i.e. 0.24 dB). In order to alleviate this situation a second embodiment of the invention employs Trellis shaping.

The basis of shaping is as follows. Consider for the purposes of illustration a situation where each group of 4 bits of data to be transmitted is sent by means of a signal point chosen from a 16 point constellation such as that shown in FIG. 3. It is immaterial for the purposes of this discussion whether the bits are raw data or whether they have been generated by a coding process of the type discussed earlier. Assuming that all combinations of data bits are equally probable, then the mean transmitter power is 10. Suppose now that the size of the constellation is increased to the 32-point constellation shown in FIG. 4. As long as single symbols are being considered there is no reason to use any of the extra points in preference to the original ones; this will merely increase the transmitted power. If however a block of four symbols (to carry 16 bits) is considered, then we see that the sequence [(3,3) (3,3), (3,3), (3,3)] has an average power of 18. If, every time this sequence would have occurred, the sequence [(5,1), (1,1), (1,1), (1,1)]—the mean power of which is 8—is sent instead then the overall mean power is slightly reduced. By making a number of such substitutions, it is possible to transmit 16 bits with four signals from FIG. 4 with an average power of 9.18. Thus the constellation could be expanded to have a minimum distance between points of 2.09 and still have an average transmitted power of 10. The resulting increase in noise immunity (the shaping gain) is 0.37 dB.

What has just been described is a shaping method that operates on a block-by-block basis. Of more interest in the present context is the use of a convolutional code to shape over an effectively infinite sequence of symbols.

For the next example it is supposed that five bits per symbol are to be transmitted. To do this without shaping requires a 32 point constellation: to allow for shaping, a 64 point constellation is chosen as shown in FIG. 5. It can be seen that the constellation is partitioned into four subgroups or "regions" (each point in FIG. 5 being represented by a digit from 0 to 3 indicating to which region the point belongs). This particular constellation and partitioning have been chosen for illustration because it is possible to view the regions as containing points of (roughly) progressively higher power as one moves from one region to the next. It should be stressed, though, that partitioning the regions in this manner is not necessary to the method.

If one were transmitting the five bits without shaping, one would use only the points in the inner regions 0 and 1. With shaping—as with the block coding example—some symbols will be chosen from the outer regions 2 and 3. The benefit of this method however arises from the transmission of more points from region 0 than from region 1. It follows from this that it is no longer possible to have a one-to-one correspondence between the 32 possible 5-bit combinations and the 32 points in regions 0 and 1. One way in which this problem may be overcome is by taking four data bits and making a fixed assignment (or "mapping") between the 16 possible combinations of these bits and the sixteen points in region 0: the same is done for each of the other three regions. Consequently, these four bits serve to identify one point in each region which is a candidate for transmission. The coding problem then reduces to one of deciding which of the four to transmit. The criteria for making this selection are that (a) the fifth bit must be recoverable by a receiver and (b) the selection should minimise the mean transmitted power.

At this point a sixth bit is introduced. The value of these sixth bits are as yet undetermined; the sequence of these bits is to be chosen so as to minimise the mean transmitted power. Suppose (FIG. 6) that these bits are supplied to the input of a convolutional coder 100. The code for this example receives one input bit and produces two output bits $CP_1$, $CP_0$. Its generator is, in delay operator form $G=[1+D+D^2, 1+D^2]$. Its circuit is a shown in the figure.

There is another circuit related to G called its syndrome H. In this case $H^T=[1+D^2, 1+D+D^2]$; it has two inputs $E_1$, $E_0$ and one output DR5 and is shown in the figure as a decoder circuit 101. The important property of G and H is that if the output of G is fed into the input of H then the output from H is zero.

A third related circuit, which is another convolutional coder, is the left inverse of H, whose generator is $H^{-1}=[D^2, 1+D+D^2]$, and this is shown as circuit 102. It has an input D5 for the fifth data bit, and outputs $CD_1$, $CD_0$. Because $H^{-1}$ is the left inverse of H, then if the output of $H^{-1}$ is fed into H, the output of H is whatever was input to $H^{-1}$.

The above labels BP6, $CP_1$ etc. refer to the connections; the actual binary signals at these connections will be designated by lower case letters. Bit pairs are indicated by omitting subscripts e.g. if $cp_1=0$ and $cp_0=1$ then cp=01. The state of the coder 100 (i.e. the contents of its delay stages at any time) is indicated as $s=s_1 s_0$. $s_1$ refers to the contents of the leftmost stage in the figure.

The outputs of the two convolutional coders are combined componentwise by exclusive OR circuits 103, 104 and fed to the inputs of the decoder circuit 101. Thus $e_1=cp_1 \oplus cd_1$ and $e_0=cp_0 \oplus cd_0$. Because of the linearity of these circuits the output dr5 of the decoder circuit 101 is always equal to the input d5 of the coder 102, irrespective of the value of bp. This property is exploited if the signal e is used to select one of the four regions at a transmitter and the decoder circuit 101 is located at a receiver where it can extract from the signals e, recovered from the received symbols, the fifth (received) data bit dr5 which (in the absence of transmission errors) will be the same as the fifth (transmitted) data bit d5 supplied to the convolutional coder 102.

Having provided for unimpeded transmission of the further data bit, the remaining task is to determine the sequence of bits b6 to be supplied to the convolutional coder 100.

A brute force method of achieving this would be, for the whole duration of a message to be transmitted, to compute the mean power for every possible sequence of bits bp, and choose the sequence bp giving the lowest result. Clearly this is impractical in terms of the delay involved—since transmission cannot commence until the bits bp have been determined—and the amount of computation involved. Instead the choice is made by performing a Viterbi decoding operation with a finite window.

Figure 7:
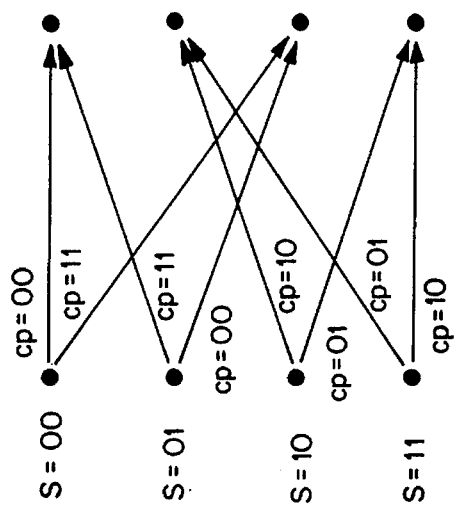
FIGS. 7 and 8 are trellis diagrams illustrating the principles of shaping.
Figure 8:
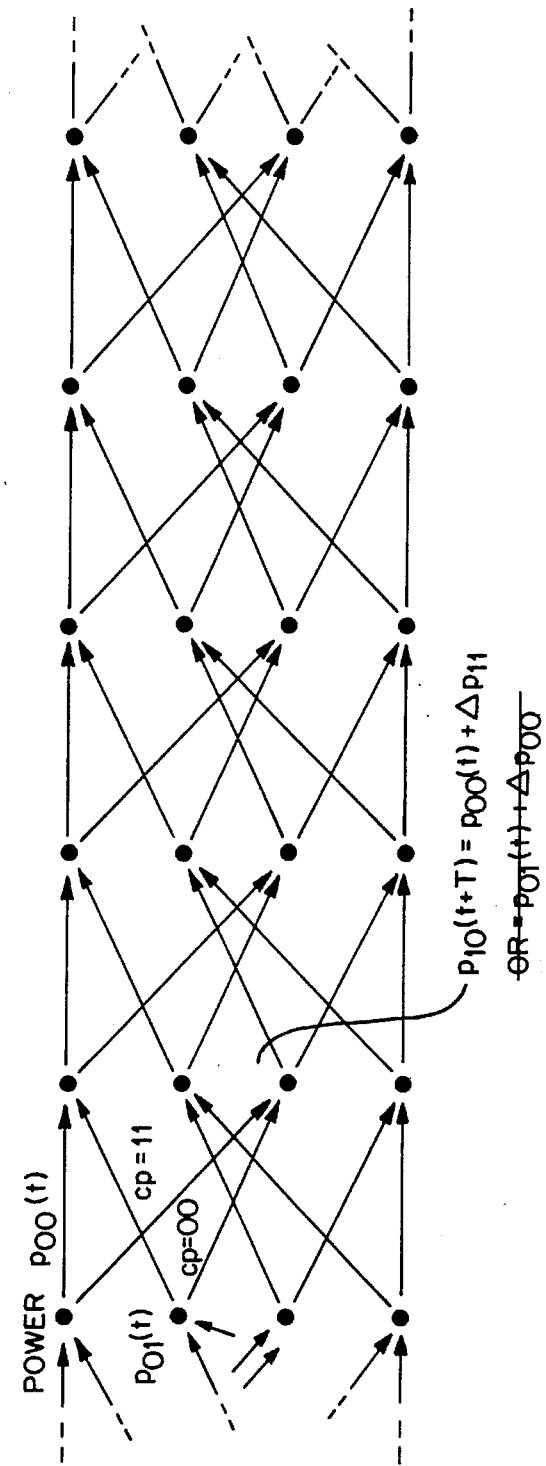

FIG. 7 shows the basic trellis diagram for the coder circuit 100. This shows the ways in which the circuit may proceed from a state s(t) at time t, shown on the left, to a state s(t+T) shown on the right. The upper path from any starting state corresponds to bp=0 and the lower to bp=1. The output cp is shown in each case. Selection of the sequence of bp amounts to a selection of a particular path of successive stages of the trellis, namely the one resulting in the lowest power: a longer trellis diagram is shown in FIG. 8. In order to achieve this we associate with each possible transition the power of the symbol which results from choosing that transition; we can write against each state at any time a cumulative power. Thus if $p_{00}(t)$ is the total power of the symbols transmitted, since some reference time, following a particular trellis path up to state s=00 at time t, then the power $p_{10}(t+T)$ associated with state s=10 at time (t+T) is $p_{00}(t)$ pulse the power of the new transmitted symbol which corresponds to selection of the 00 to 10 transition.

We call this $\Delta p_{cp} = \Delta p_{11}$ since cp=11 for this path; though of course $\Delta p_{cp}$ also depends on cd (which together with cp determines e and hence the region selected, and on the other four data bits (since the points in any given region of the constellation do not all have the same power).

Since any state always has two paths terminating at it, then according to the Viterbi algorithm, one discards the path having the higher cumulative power, leaving only the other "survivor" path. This is illustrated in FIG. 8 in that the second candidate for $p_{10}(t+T)$, namely $p_{01}(t)+\Delta p_{00}$ is struck out on the assumption that it is larger than $p_{00}(t)+\Delta p_{11}$.

As has already been mentioned, this decoding takes place over a finite window. Suppose that the window extends from time to time t to time t+3T (although in practice the window would be larger than this), and the state of the coder at time t has already been determined. By computing the cumulative powers from left to right, for all paths starting at that state, the state at time t+3T having smallest $p_{cd}(t+3T)$ can be identified; the path at time t corresponding to this path is then known, and hence the corresponding cp. This, with cd, determines the required region and a symbol can be transmitted. The state at time t+T is also now fixed and the window can now be shifted one place (i.e. T) to the right and the process repeated. This procedure, as described, is not optimum in terms of computational complexity (as will be seen below) but serves to illustrate the principle.

Some other points should be noted at this point.

(i) it is not necessary that the number of regions be four. There must be at least three, but there is no upper limit.

(ii) it is not necessary that the mean power of the points in one region differs from that in another region: the constellation of FIG. 5 could in principle be divided into four quadrants. It is however necessary that when the data have been used to select one point in each region, the four points that remain for selection offer a choice of powers—at least some of the time and preferably all the time.

(iii) the above example assumes that a region contains sufficient points to transmit all but one of the data bits to be coded onto a symbol; however there is no reason why smaller regions could not be used, with more than one data bit participating in the shaping process.

Figure 6:
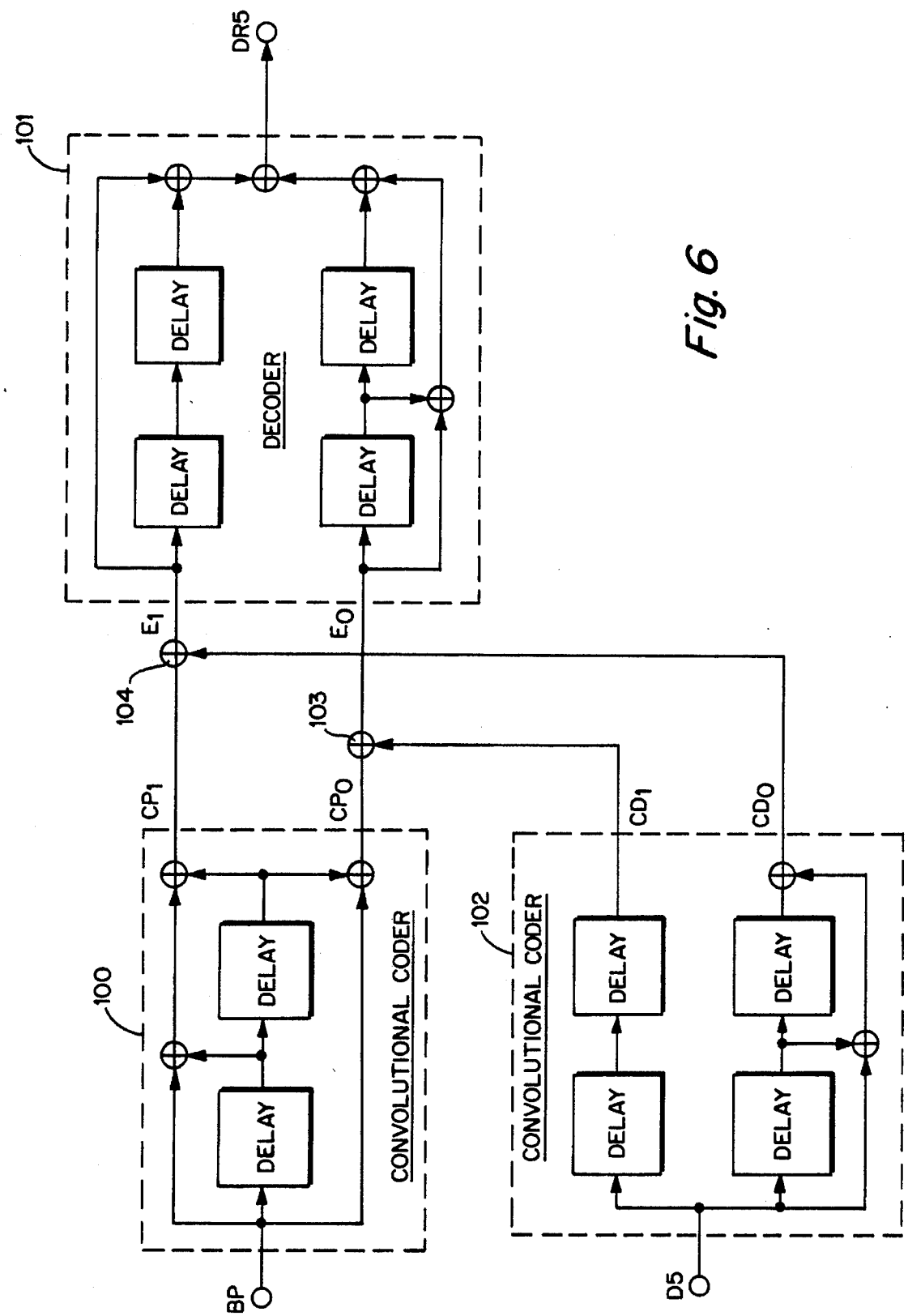
FIG. 6 is a block diagram illustrating the principles of shaping.

(iv) FIG. 6 is merely illustrative: for example, a real coder does not need to contain the convolutional coder circuit 100; as the coded bits cp are determined rather than bp, they can be used directly and the coder 100 does not physically exist. Its significance is in defining the relationship between $cp_0$ and $cp_1$ and that between cp and H and $H^{-1}$.

(v) shaping would not be used on constellations containing four points or fewer. For example, when transmitting 2 and 3 bits (total) per symbol one would transmit the three bits on a 16-point constellation but transmit the two bits on a four-point constellation, shaping not being employed.

Figure 9:
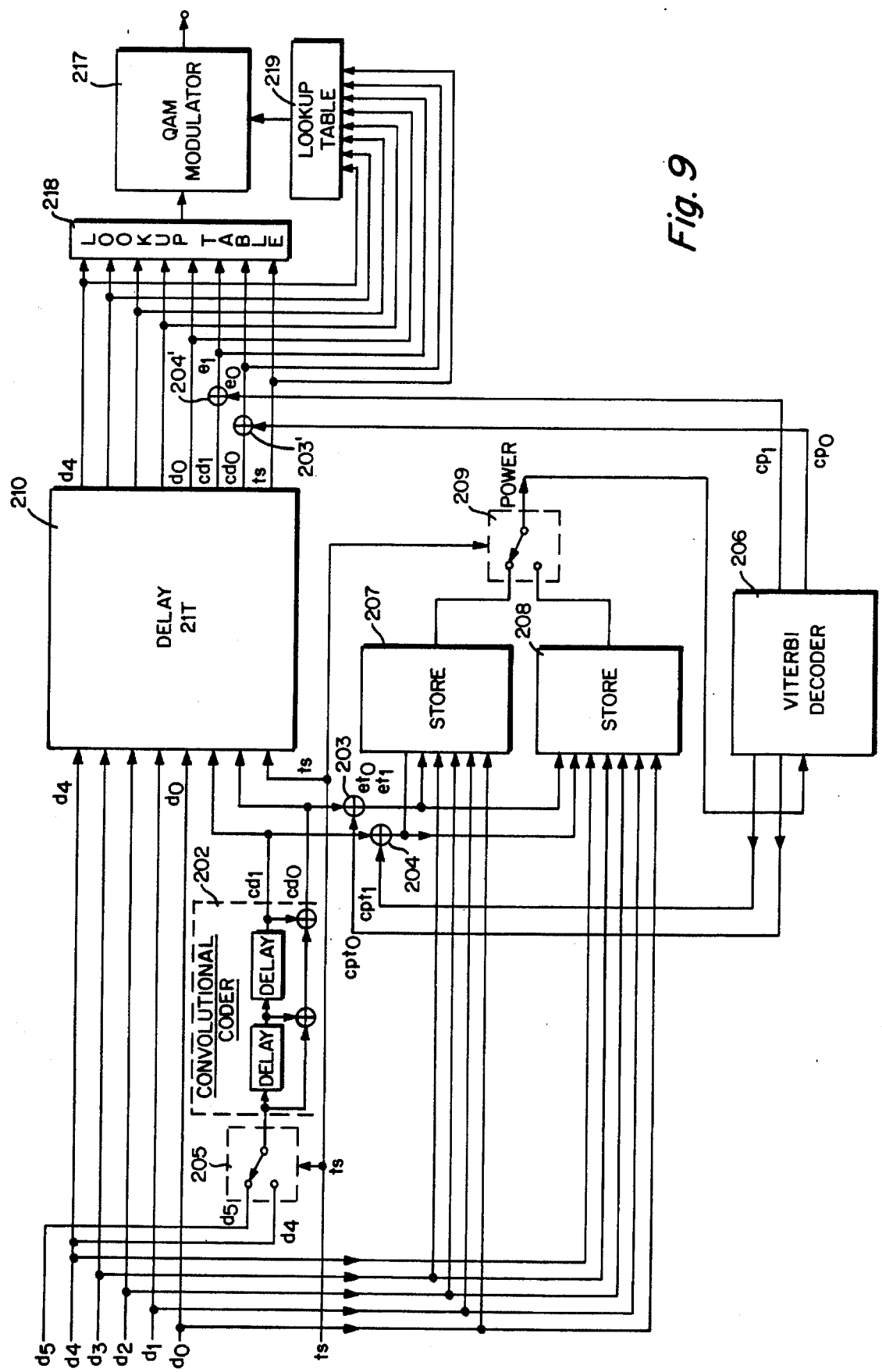
FIG. 9 is a block diagram of a shaping unit for use with the apparatus of FIG. 1.

FIG. 9 shows a practical embodiment employing trellis shaping, which receives the signals output from the selector 15 of FIG. 1. For the purposes of this example it is assumed that FIG. 1 is set to a data rate of 14400, so that k=5; i.e. without trellis shaping transmission takes place using symbols selected from $2^5=32$ and $2^6=64$ point constellations. Groups of 6 bits $d_5 \ldots d_0$ are received once every symbol period T, from the selector 15, $d_0$ being a coded bit from the convolutional coder 2 and the remainder being uncoded bits. One bit ts from the selector 15' (a constellation switching bit) indicates if 1 that there are six data bits and if 0 that there are five (in which case $d_5$ is to be ignored).

Assume, as in the illustration above, that four regions are to be used. Then for transmission of five data bits a 64 point constellation is needed and for 6, a 128 bit constellation. The former is partitioned into regions as already shown in FIG. 5, and the latter as shown in FIG. 10. Each of the 16 possible combinations of the four bits $d_3 \ldots d_0$ is allocated a respective point from each of the four regions of FIG. 5; similarly each of the 32 possible combinations of the five bits $d_4 \ldots d_0$ is allocated a respective point from each of the four regions shown in FIG. 10. Details of this allocation (often referred to as point labelling) will be discussed below. The allocation information is embodied in stored look-up tables shortly to be described. The most significant valid data bit $d_5$ or $d_4$ is selected by a selector 205 controlled by the bit ts and is supplied to a convolutional coder 202 identical to the coder 102 of FIG. 6 to produce two coded bits $cd_0$, $cd_1$ which are combined in exclusive OR circuits 203, 204 with trial bits $cpt_0$, $cpt_1$ from a Viterbi decoder 206 to produce a trial region number $et_0$, $et_1$.

A store 207 contains a look-up table with 64 entries each representing the power of one of the points of the constellation of FIG. 5. It is accessible by means of a 6 bit address, namely $et_1$, $et_0$ from the exclusive OR gates 204, 203 representing the region and databits $d_3 \ldots d_0$ identifying the point allocated to it within that region. Similarly, a store 208 has 128 entries representing the powers of the points of FIG. 10. There the 7 address inputs are $et_1$, $et_0$ and data bits $d_4 \ldots d_0$. The output of one or other store is chosen by a selector 209 controlled by ts. The use of a look-up table is preferred in terms of speed and implementation. If however the labelling of the points is systematic, then the powers could be calculated, in which case the store 207 (and 208) would be replaced by a calculation unit in which was stored a sequence of program instructions defining the point mapping.

Each symbol period, the Viterbi decoder 206 supplies to the exclusive OR gates four successive values cp, and thus receives from the selector 209 four power values which indicate the powers of the four points (one in each region of the relevant constellation) which correspond to those values of cp, taking into account the values of $d_0 \ldots d_5$, $cd_1$, $cd_0$ and ts. The operation of the Viterbi decoder is the same as for the Viterbi decoder decoding data coded using a convolutional code, except that it receives the path metrics (i.e. the powers) instead of having to compute them by forming the distances between input data and the data associated with the paths. The trellis diagram of FIG. 7 is inherent in the operation of the Viterbi decoder which now has sufficient information to decide on regions. The mode of operation described earlier for illustrative purposes (where metrics were added over the trellis afresh for each window position) is not the usual one: though it works, it is less computationally onerous to simply update the result from the previous window position. The problem with this is that it is possible thereby to choose a path within the current window which is inconsistent with earlier decisions (now outside the window) about the path. This can have serious consequences and is therefore necessary to ensure that the survivor path chosen at the end of the window is in fact a path which started at the (now fixed) state at the beginning of the window. This can be done by eliminating, before the next update, any paths that do not converge with the chosen survivor path within the decoding window.

A typical window length would be in the range 16 to 30. Assuming a window length of 20, this means that there is a delay of 21T between receipt of the data and the Viterbi decoder 206 producing as an output the bits $cp_0$, $cp_1$ for that symbol. Bits $d_0$–$d_4$ and $cd_1$, $cd_0$ are thus delayed by 21T in a delay unit 210. The delayed convolutionally coded bits $cd_1$, $cd_0$ are combined with the bits $cp_1$, $cp_0$ from the Viterbi decoder in exclusive OR gates 203', 204' to produce region bits $e_1$, $e_0$. These, together with the delayed data bits $d_0 \ldots d_4$ and the switch bit ts uniquely identify the signal point to be transmitted and are fed to look-up tables 218, 219 and a QAM modulator 217 analogous to units 18, 19 and 17 of FIG. 1.

Although for the purposes of clarity the shaping arrangements depicted in FIG. 9 have been shown only for a single data rate, for use with FIG. 1 for the range of data rates, the number of data bits will of course be switchable and the look-up table 207, 208, 218, 219 be switched in like manner to the tables 18, 19 of FIG. 1.

The use of trellis shaping in the manner described provides (for a given power) an increase in noise immunity. However, in addition to the improvement inherent in the use of trellis shaping we also find that the loss due to the use of two constellations rather than one is additionally compensated.

It has already been mentioned that the minimum number of regions is three rather than four envisaged by FIG. 9. If it were desired to operate the arrangement of FIG. 9 with only three regions—e.g. avoiding transmission of points in region 3 of FIGS. 5 and 10—then this can readily be accomplished by setting the power levels stored in the tables 207, 208 for the points of region 3 to a very large number, thereby ensuring that the Viterbi decoder 206 never chooses a trellis path resulting in transmission of a signal corresponding to a point in the fourth region. Should it be desired to employ shaping in the case discussed earlier where a constellation having a number of points which is not a power of two is in use, then this may be done in similar fashion. If, for example, we suppose that a symbol is to carry 5½ bits, then, without shaping, a 48-bit constellation is required. With shaping, we define a constellation having three (or more) regions of 24 bits each, each region having 16 "inner" points and 8 "outer" points. Coding of 4½ bits onto a region can be performed (without at this stage choosing which region is to be used) as before by taking a pair of symbols and processing them jointly in the manner described earlier. This can be done whether or not the two symbols are carrying the same number of bits, as long as they are both carrying an extra half-bit. Once this is done, then one point in each region has been identified and the remaining 1 bit per symbol is used in the shaping process, exactly as described with reference to FIG. 9, to choose the regions.

III. Synchronisation

Another consideration to be discussed is that of frame synchronisation. It is essential for the decoding of the signals generated by FIG. 1 or FIG. 9 that a decoder is synchronised to the framing structure inherent in the transmission of d bits of a frame of A bits using symbols from different constellations. This is needed for correct decoding of the modulation code (if c≠0) and correct interpretation of "small" and "large" symbols. It also enables (optionally) multiplexing of the transmitted data into separate sub channels (e.g. of 2400 bit/s each). It is possible to gain such synchronisation without explicit transmission of framing information, since the receipt of a symbol in region 2 or 3 of FIG. 10 necessarily indicates that the larger constellation is in use: however even when the larger constellation is used, symbols may be transmitted from region 0 to 1—indeed the trellis shaping will have the effect of choosing the lower power regions preferentially to regions 2 or 3.

To improve the speed and reliability of synchronisation one symbol (chosen to be from a large constellation) per block, where a block is an integer number of frames, may be designated as a synchronisation symbol. If trellis shaping is restricted to regions 0, 1 and 2, then synchronisation can readily be provided for by allowing the synchronising symbol to use region 3, the region of highest average power. One possible method proceeds as follows. Trellis shaping operates without modification. When a point in region 1 or 2 is chosen for the synchronisation symbol, this is transmitted as before. If however a point in region 0 is chosen, then a symbol from region 3 is transmitted instead (in principle regions 1 or 2 could be selected for this substitution but region 0 is preferred since it is statistically likely to be chosen more often). Whenever the decoder encounters a symbol from region 3 it regards this (for the purpose of decoding the data) as equivalent to a symbol from region 0, but also recognises it as a synchronisation symbol for maintaining frame synchronisation. Although this does not guarantee transmission of synchronisation information for every block, it does provide for easy synchronisation; though at the expense of a slight power increase, since the substitution is not taken into account by the shaping process. Use of a synchronising symbol may be combined with the transmission of a low-speed side channel, the conversion from region 0 to region 3 then being made dependent on a side-channel data bit. This may necessitate a shorter block (a smaller multiple of AT) in order to ensure enough synchronising (region 3) conditions and to give a required side channel data rate. The available side channel data rate will depend somewhat on the data rate in the main channel. Alternatively, another symbol (i.e. other than the one used for synchronisation) in the block may be designated for this purpose. Then, when a symbol from region 0 has been chosen a substitution of a region 3 symbol can take place, or not, depending on the value of a bit to be transmitted. If region 0 has not been chosen then transmission of the side channel bit is delayed to the next symbol in the block (or to the next designated symbol) for which region 0 has been selected. Confusion between synchronisation symbols and "side-channel" symbols may be avoided either by designating for the side channel a symbol chosen from the smaller constellation or by ensuring that a decoder distinguish between the two on the basis that a synchronisation symbol never occupies region 0 whilst a "side-channel" symbol sometimes does.

A slightly different version of the synchronisation arrangements operates as follows. In the previous version the transmission of points in region 3 of the larger constellation was inhibited by setting the stored power levels in the tables 207, 208 to a large number. This modified version also involves the "falsification" of the power figures to achieve a desired result, but now the nature of the falsification is time-variant, being, for the symbols designated for synchronisation, different from that for other symbols. In the latter case, the power signal is set to a large number for region 3 and inhibits transmission of points in that region; for the synchronisation symbol however, the correct figures are supplied for region 3 thereby permitting transmission of a symbol from outer region for this symbol Although this would work, only a minority of the synchronism symbols would in fact be chosen from region 3, and therefore to increase the probability of such a symbol being sent it is preferred also to falsify the power figures for regions 0, 1 and 2 by (a) setting the figures for regions 0 and 1 to high values, and (b) supplying in the case of a region 2 point, the true power figure scaled up by a factor such that the mean power of the region 2 points appears to be the same as that of the region 3 points. The effect of this is to inhibit the use of symbols from regions 0 and 1 and increase the probability of transmission of a region 3 symbol as opposed to a region 2 symbol.

Figure 12:
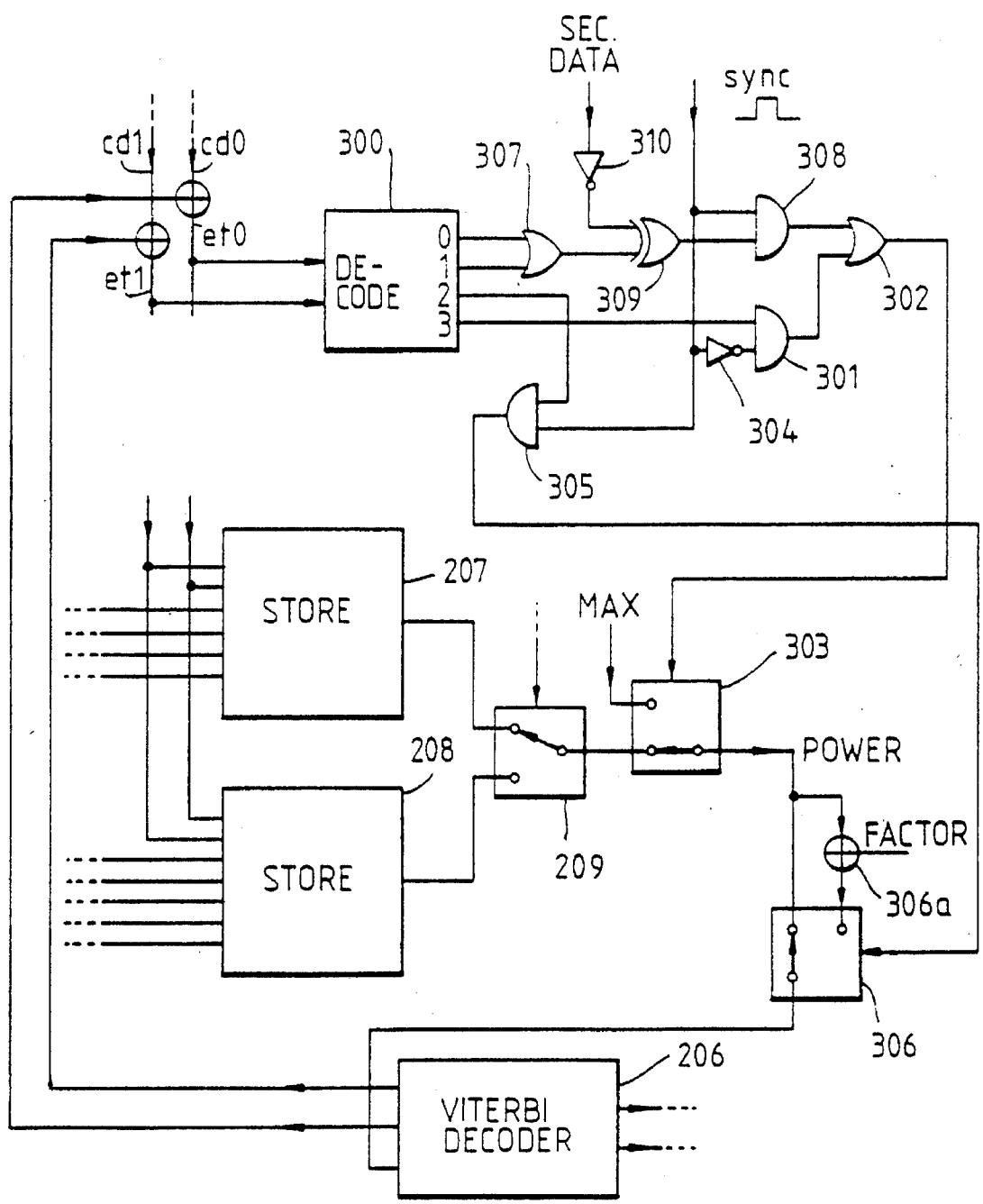
FIG. 12 illustrates modifications of FIG. 9 with provision for synchronisation.

This can be achieved using the logic circuitry shown in FIG. 12, where parts of FIG. 9 are redrawn to show their relationships with the additional circuitry. An active-high signal "sync" is low except during a synchronising symbol. A two to four line decoder 300 decodes the region number et and its "3" output passes, for non synchronising symbols via an and-gate 301 and or-gate 302 to a changeover switch 303 which intercepts the output of the switch 209 and forces it to some maximum value. When the synchronising signal is present then the and-gate 301 is inhibited via an inverter 304. If et=2 has been decoded then an and-gate 305 is enabled and causes a changeover switch 306 to bring a multiplier 306a into circuit to multiply the power signal by a factor equal to the ratio of the mean region 3 power to the mean region 2 power.

If on the other hand "0" or "1" is decoded (and combined in an or-gate 307) it enables an and-gate 308 and (via the or-gate 302) enables the switch 303 to force the power figure to the Viterbi decoder to maximum.

If a secondary channel is also to be carried on this symbol then this can be accommodated by using the secondary channel bit to invert (using an exclusive-or gate 309) the output of the and-gate 307 so that the symbol choice is forced to regions 0 and 1 instead of 2 and 3. An inverter 310 inverts the secondary data (assuming that the idle state of the latter is logic 1) so that synchronisation is unaffected when the second channel is idle.

One advantage of this proposal over the previous one is that when a region 3 symbol is transmitted, the true power figure for this symbol is provided to the Viterbi decoder which will tend to make lower power choices for the neighbouring symbols than was the case previously. If (as is common) a band limiting filter is used on the modulator output, the spreading effect of the filter, and the reduction in neighbouring symbol powers tends to mitigate the effect of the larger, synchronising, symbol on the peak-to-mean power ratio of the signal, often an important consideration in modulation systems.

If desired, this effect may be enhanced by artificially increasing the power signals (for all three regions) supplied in respect of the adjacent points. Typically this increase might be say ×1.5 for the immediately adjacent symbol and ×1.25 for the next nearest symbol, though in practice the factors would be chosen to suit the tap weights of the filter actually used. This could be achieved by the use of arrangements similar to the switch 306 and multiplier 306a.

IV. Nested Constellations for Trellis Shaped Systems

Returning now to the constellations used, the embodiment described in FIG. 9 employed the two constellations shown in FIGS. 5 and 10. These are 'nested' in the sense that the signal points in FIG. 5 are all present in the constellation of FIG. 10. It is not essential that the two constellations be related in this way but it is convenient; a small economy of storage in the look-up tables in FIGS. 1 and 9 is possible if the addressing is arranged so that a single location is used to store the coordinates (or power) of a point common to both constellations but the greater advantage is that the front end of a receiver for receiving the transmitted signals has to deal with effectively only one constellation rather than two.

Where switching between multiple data rates is provided, then this approach can be extended by providing that all constellations used (from 16 points upwards) are subsets of a single large constellation—as illustrated in FIG. 13 where the dotted boxes enclose successively larger constellations. It is also convenient to provide that the division into regions maps in the same way—viz that two of the shaping regions of a large constellation are formed by adding respective pairs of regions of the half-size constellation which it contains.

We turn now to details of the mapping between bits to be transmitted and signal points. These bits fall into three categories:

(i) two bits generated by the shaping process: the mapping of these onto a constellation has already been described: they determine selection of one of four regions into which the constellation to be used is divided.

(ii) a variable number of uncoded bits.

(iii) two bits generated by the convolutional coder of FIG. 1. In order that the coding gain obtainable with convolutional coding be achieved it is necessary that these bits serve to select (in conventional manner) among four subsets of the signal points within a region. Assuming as before that the minimum distance between points of the constellation is 2 then the subsets are chosen such that the minimum distance is 4. (In general if the number of bits is $n_c$ then the number of subsets is $2^{n_c}$ and the minimum distance $2 \times 2^{n_c/2}$). FIG. 11 shows a 16 point region divided into subsets a, b, c, d.

The remaining problem is thus the mapping of the uncoded bits to the subset of a region. As these bits are uncorrelated with the "shaping" bits (i) and coded bits (iii), the mapping of these bits to the signal points within a given region is arbitrary: however, the relationship between the mapping in one region to that in another region is of crucial significance to the effectiveness of the shaping process. For given values of the input bits for a particular symbol, the Viterbi decoder has a choice of four values of cpt and thus a choice among four signal points, one in each of the four regions. It is obvious that, if the mapping is such that, for all values of the input, these four candidate points all have the same power, then no improvement in average power will be obtained by making any particular choice! More generally, it is apparent that some mappings will provide more scope than others for such improvements. The objective may be thought of, qualitatively, as offering the Viterbi decoder a wide choice of different powers over the four candidate points.

Suppose, for a moment, that the $2^{n_u}$ combinations of the $n_u$ uncoded bits are assigned to the points of a subset within region 0 of the constellation in ascending order of power—i.e. if the binary value (conventionally referred to as the "point label") of the $n_u$ bits is V, then, if $V_i > V_j$, power of the point labelled $V_i$ is greater than or equal to the power of the point labelled V.

Looking at the trellis diagram of FIG. 7 for the shaping code, from a given trellis state, the Viterbi decoder 206 has a choice between two paths and thus a choice between cp=00 or 11 or a choice cp=01 or 10. The region number is obtained by an exclusive-OR (203', 204') with cd determined by the data but this still results in a 00/11 choice or a 01/10 choice i.e. the convolutional code G implies a pairing of the regions (the actual pairing depending on the code chosen). This property probably holds true for all linear convolutional codes, but not always in the case of a non-linear code.

It is preferable that the labelling in region 3 (the "other choice" from region 0) follows the reverse sequence from region 0—viz. descending order of power; thus one has a choice between a point in region 0 having a low power (for that region) and a point in region 3 having a high power (for that region); or vice versa. The same applies to regions 1 and 2, relative to one another.

Less obviously, but also true, when dealing with substantially concentric regions is the desirability of a similar relationship between regions 0 and 3 on the one hand and regions 1 and 2 on the other: thus we have:

> Region 0 ascending
> Region 1 descending
> Region 2 ascending
> Region 3 descending.

This in itself is not new.

Recalling that the labelling in any one given region is arbitrary, we can drop the constraint that the points in region 0 are labelled in ascending order of power, and generalise the above statement by saying that if the powers of the points in regions 1, 2 and 3 are ordered according to an ascending order of the powers of the correspondingly labelled points in region 0, then they form, respectively, descending, ascending and descending series.

The objective of this aspect of the invention is to apply a single labelling system to a set of nested constellations. Suppose, starting with the constellation just discussed, we require a constellation of twice the size. Then Region 0 of the new constellation (R0') is obtained by combining regions 0 and 1 of the first; and new region (R1') from old regions 2 and 3. Up to this point it has been assumed that the same labels are used in the four original regions: we now need to append an additional (most significant) bit to the labels to accommodate an additional uncoded data bit. Thus for the new region R0' the points from R0 have a leading 0 added to the label, and those from R1 a leading 1. For R1', however, the leading bits for the points of R2 and R3 are 1 and 0 respectively, in order to preserve the "ascending/descending" property discussed above for the new regions.

Another way of viewing this situation is as follows. A constellation has 16M points. If each region is represented by M points (in one subset) the 4M points are ordered as follows:
— the points 0 to M−1 are the points of R0;
— the points M to 2M−1 are the points of R1 in reverse order of power from those of R0;
— the points 2M to 3M−1 are the points of R3 in reverse order of power from those of R0; and
— the points 3M to 4M−1 are the points of R2 in the same order of power as those of R0.

Where two points in a region have the same power they can be ordered by their x-coordinate. Other tie-breaking methods could also be used.

Given a points ordering as above the ordering for the next set of regions is easy to derive. Suppose the constellation to be shaped is doubled. Each region is now represented by 2M points. R0 and R1 combine to form a region as do R2 and R3. The ordering of the points in the first two regions can be exactly the same as above. That is points 0 to 2M−1 come from R0 and R1 and points 2M to 4M−1 of R1' come from R2 and R3. These are the two lowest power regions in the new constellation. Let R2' and R3' be the other two regions with the power of R2' less than the power of R3'.

The points in R3' are labelled 4M to 6M−1 and are in an order that follows the reverse order of the points 0 to 2M−1. As the power of the points 0 to 2M−1 ascends so the power of the points 4M to 6M−1 descends. The points of region R3' are labelled 6M to 8M−1 and their power ascends as the power of the points 0 to 2M−1 ascends.

This is further illustrated by the following example:

Start with a 16 point constellation M=1 and so each region has one point per subset in it. These have coordinates (−1,−1), (3,−1), (3,3) and (−1,3). The power of these points (regions) is 2, 10, 18 and 10 respectively. Therefore, using the x coordinates rule we have

R0=(−1,−1), R1=(−1,3); R2=(3,−1); R3=(3,3).

Thus the point labels are:

| 0 (−1,−1) | 1 (−1,3) | 2 (3,3) | 3 (3,−1). |

Now extend the constellation to 32 points. This adds the points (−1,5), (3,−5), (−5,−1) and (−5,3). Using the recursive algorithm this gives a point order of

| 0 (−1,−1) | 2 (3,3) | 4 (−5,3) | 6 (−5,−1) |
| 1 (−1,3) | 3 (3,−1) | 5 (3,−5) | 7 (−1,−5). |

This process can be continued indefinitely. The point ordering that results from this start for a 512 point constellation is shown in FIG. 13. The labels are shown (as decimal numbers) for the points of subset a only.

Thus where the apparatus of FIG. 9 (with or without the convolutional coding of FIG. 1) is used, with the facility of switching data rate, then the constellation (or two constellations) used at each rate may be selected from FIG. 13. This has the advantage that a single point labelling can be used for all desired data rates. The point labelling used enables a good shaping gain at all rates. This is a direct improvement over designing and labelling a new constellation for each data rate.

As an alternative to the "square" constellation nesting shown in FIG. 13, the mapping shown in FIG. 14 may be used. This shows the point labelling (in hexadecimal) for the lower right quadrant of the phase diagram, and is closer to the (ideal) nesting of concentric circles where the points of each successive region all have higher powers than the points of all previous regions. The labelling shown is obtained by the algorithm below (written in 'C') (for points of equal power, the tie-break used was to take the points having the smallest modulus of the y-coordinate first).

```
label [0] = power [0] = 0;
label [1] = power [1] = 1;
for (i = 2; i < 2^m; i* = 2)
    for (j = i; j < i*2; j ++) {
        power [j] = power [j − i] ^ (2*i − 1);
        label [j] = label [j − i] ^ (i*3/2);
    }
```

The indices of label [ ] are the numbers of the points when ordered in ascending order of power, so that the label for the lowest power point is label [0] and that for the second lowest power point is label [1] and so on. Where trellis shaping is used, this labelling gives comparable shaping gains to the labelling of FIG. 13.

We claim:

1. A method of transmitting data using quadrature amplitude modulation, said method comprising the steps of:

assembling groups of q bits, coding one or more of the bits of each said group by a convolutional or block code to produce an augmented group having at least q+1 bits, selecting for each said augmented group a symbol for transmission from a signal point constellation having more than $2^q$ points by using a variable mapping, the mapping being controlled by generating, for each augmented group, power signals representing the signal power corresponding to each of a plurality of alternative mappings of the group, and decoding the power signals by a Viterbi decoder to determine a mapping for that group which substantially minimizes the time averaged power of transmitted symbols, the number of bits q per group being repetitively variable, the signal constellation and mapping associated therewith for each group being chosen according to the value of q for that group, and the power signals being generated in response to a signal indicative of the value of q and in response to stored information defining the mappings to produce power signals corresponding to the mappings associated with the chosen constellation.

2. A method as in claim 1, wherein:

each constellation comprises a plurality of subgroups of points, the mappings associated with each constellation comprise a fixed mapping between bits of the group other than said one or more bits and the points of a subgroup wherein those bits serve to select one candidate point within each subgroup and a variable mapping between the other bits of the augmented group and the subgroups so that those bits serve to select one subgroup and hence one of the candidate points.

3. A method as in claim 1, in which:

one bit of each group is coded by a convolutional code to produce two bits, each augmented group having q+1 bits;

each constellation comprises three or four subgroups of points, each subgroup having $2^{q-1}$ bits;

the mappings associated with each constellation comprise a fixed mapping between the q−1 bits of the group other than said one bit and the points of a subgroup, those bits serving to select one candidate point within each subgroup and a variable mapping between the other two bits of the augmented group and the subgroups so that those two bits serve to select one subgroup and hence one of the candidate points.

4. A method as in claim 2 in which:

the value of q varies according to a predetermined pattern within a framing structure, the largest constellation having additional signal points forming an additional subgroup thereof not included in said mapping, and in which, at a predetermined position within each frame of the framing structure which employs the largest constellation, whenever one predetermined subgroup is selected for that position, a signal from the additional subgroup is transmitted in lieu thereof.

5. A method as in claim 1, in which:

the constellation comprises a plurality of subgroups of points, the transmission having a framing structure, and a first variable mapping is employed for a symbol at a predetermined position within each frame of the framing structure and a second variable mapping is employed for the remaining symbols of that frame, the first variable mapping permitting selection of a symbol from a subgroup having a larger mean power than the remaining subgroups and the second mapping not permitting selection of a symbol from that subgroup.

6. A method according to claim 1, in which the number of transmitted bits per symbol is a rational non-integer greater than unity which, when expressed as a ratio B/A of two integers having no common factor, the denominator A is not a power of two, and wherein each group of B bits is transmitted by A symbols, where d is an integer less than A and greater than or equal to 1, each of A−d symbols being chosen from a first signal point constellation having a first value of q and each of the d symbols being chosen from a second, larger, signal point constellation.

7. A method of transmitting data using quadrature amplitude modulation, said method comprising the steps of:

assembling groups of q bits, coding one or more of the bits of each said group by a convolutional or block code to produce an augmented group having at least q+1 bits, selecting for each said augmented group a symbol for transmission from a signal point constellation having more than $2^q$ points by using a variable mapping, the mapping being controlled by generating, for each augmented group, power signals representing the signal power corresponding to each of a plurality of alternative mappings of the group, and decoding the power signals by a Viterbi decoder to determine a mapping for that group which substantially minimizes the time averaged power of the transmitted symbols, the constellation including a plurality of subgroups of points, in which the transmission has a framing structure, and using a first variable mapping for a symbol at a predetermined position within each frame of the framing structure and a second variable mapping for the remaining symbols in that frame, the first variable mapping permitting selection of a symbol from a subgroup having a larger mean power than the remaining subgroups and the second mapping not permitting selection of a symbol from that subgroup.

8. A method as in claim 7 in which the constellation has first, second, third and fourth said subgroups, each successive subgroup having progressively larger mean powers, and in which the first variable mapping does not permit selection of a symbol from the first and second subgroups.

9. A method as in claim 8 including determining which of the two variable mappings to use by supplying to the Viterbi decoder, for candidate points belonging to the fourth subgroup, (a) for the symbol at the predetermined position, power signals representing the true power of those points and (b) for other symbols, power signals having a value higher than the true power value to suppress selection of those candidate points.

10. A method as in claim 9 including the step of supplying to the Viterbi decoder for candidate points belonging to the first and second subgroups:

(a) for the symbol at the predetermined position, power signals having a value higher than the true power value to suppress selection of those candidate points, and (b) for the other symbols, power signals representing the true power of those points.

11. A method as in claim 10 including the step of supplying to the Viterbi decoder for a candidate point belonging to the third subgroup:

(a) for the symbol at the predetermined position, power signals representing in each case a power larger than the actual power such that the mean power represented for all the points in the subgroup is substantially equal to the mean power of the points in the fourth subgroup; and (b) for the other symbols, power signals representing the actual power of those points.

12. A method of transmitting data using quadrature amplitude modulation, said method comprising the steps of:

assembling groups of q bits, coding one or more of the bits of each group by a convolutional or block code to produce an augmented group having at least q+1 bits, selecting for each said augmented group a symbol for transmission from a signal point constellation having more than $2^q$ points by using a variable mapping, the mapping being controlled by generating, for each augmented group, power signals representing the signal power corresponding to each of a plurality of alternative mappings of the group, and decoding the power signals by a Viterbi decoder to determine a mapping for that group which substantially minimizes the time averaged power of transmitted symbols, the constellation including a plurality of subgroups of points, the symbol transmission having a framing structure, the constellation having additional signal points forming an additional subgroup not included in said mapping, and at a predetermined position within each frame of the framing structure, whenever one predetermined group is selected for that position, a signal from the additional subgroup is transmitted in lieu thereof.

13. A method of transmitting data using quadrature amplitude modulation, said method comprising the transmission of a number of bits B per frame of A symbols providing a number of bits per symbol that is a rational non-integer greater than unity which when expressed as a ratio B/A of two integers having no common factor, the denominator A is not a power of two, each group of B bits being transmitted by A−d symbols, where d is an integer less than A and greater than or equal to 1, each of the A−d symbols being chosen from a first signal point constellation and each of the d symbols being chosen from a second, larger, signal point constellation.

14. A method as in claim 13 wherein:

one said signal constellation has a number of signal points equal to a power of two and the other said signal constellation includes a first plurality of points that is a power of two in number and a second plurality of points, that is in number half as many as the first plurality and having a higher average power than the first plurality, and the signal points chosen from the other constellation are coded in pairs such that each pair contains at most one symbol from the second plurality of points.

15. An apparatus for transmitting data using a quadrature amplitude modulation, said apparatus comprising:

(a) means for assembling successive groups of q bits;

(b) means for coding one or more bits of each group by a convolutional or block code to produce an augmented group having at least q+1 bits;

(c) means for selecting for each said augmented group a symbol for transmission from a signal point constellation having more than $2^q$ points using a variable mapping, (d) means to generate, for each augmented group, power signals representing the signal power corresponding to each of a plurality of alternative mappings of the group;

(e) means for receiving said power signals and, in dependence on the power signals for a plurality of groups, to determine mappings therefor which substantially minimize the time averaged power of the groups;

(f) switching means for determining a framing structure for the transmission and for selecting groups having different numbers q of bits, and different signal constellations and mappings associated therewith, to control the power signal generating means (d) to produce power signals corresponding to the selected respective mappings and constellations.

16. An apparatus as in claim 15, in which:

each constellation comprises a plurality of subgroups of points, the mappings associated with each constellation comprise a fixed mapping between the bits of the group other than the one or more bits and the points of a subgroup, those bits serving to select one candidate point within each subgroup and a variable mapping between the other bits of the augmented group and the subgroups, those bits serving to select one subgroup and one of the candidate points.

17. An apparatus for transmitting data using a quadrature amplitude modulation, said apparatus comprising:

(a) means for assembling successive groups of q bits;

(b) means for coding one or more bits of each group by a convolutional or block code to produce an augmented group having at least q+1 bits;

(c) means for selecting for each said augmented group a symbol for transmission from a signal point constellation having more than $2^q$ points using a variable mapping;

(d) means to generate, for each augmented group, power signals representing the signal power corresponding to each of a plurality of alternative mappings of the group;

(e) means for receiving said power signals and, in dependence on the power signals for a plurality of groups, to determine mappings therefor which substantially minimize the time averaged power of the groups;

(f) switching means for determining a framing structure for the transmission and for selecting a first variable mapping to be employed for a symbol, chosen from a constellation comprising a plurality of subgroups of points, at a predetermined position within each frame of the framing structure and a second variable mapping to be employed for other symbols chosen from the constellation, the first variable mapping permitting selection of a symbol from a subgroup having a larger mean power than the remaining subgroups and the second mapping not permitting selection of a symbol from that subgroup, to control the power signal generating means (d) to produce power signals corresponding to the selected mappings.

18. An apparatus for transmitting data using quadrature amplitude modulation, said apparatus comprising:

(i) means for assembling groups of q bits and coding one or more of the bits of each said group by a convolutional code to produce an augmented group having at least q+1 bits;

(ii) means for selecting for each said augmented group a symbol for transmission from a signal point constellation having more than $2^q$ points using a variable mapping, the mappings being controlled by generating, for each augmented group, power signals representing the signal power corresponding to each of a plurality of alternative mappings of the group, and decoding the power signals by a Viterbi decoder to determine a mapping for that group which substantially minimizes the time averaged power of transmitted symbols;

(iii) switchable means for operating said apparatus at any one of a plurality of data rates;

(iv) means for generating signals selected from a signal point constellation of a nested set of signal constellations, each larger constellation having twice as many points as, and including all points of, the next smaller constellation;

(v) each constellation including a first, second and third subgroups of points, the mappings associated with each constellation having a fixed mapping between bits of the group other than said one or more bits and the points of a subgroup, those bits serving to select one candidate point within each subgroup and a variable mapping between the other bits of the augmented group and the subgroups, those bits serving to select one subgroup and one of the candidate points;

(vi) in any constellation, the average power of the first subgroup being less than that of the other subgroups, the average power of the second subgroup being less than of the third and that of the third being less than that of any further subgroup;

(vii) the said fixed mapping in each subgroup being such that:
if the points in the second subgroup are ordered in ascending order of the powers of the points having the same mapping in the first subgroup then the powers of those points are in descending order;
if the points in the third subgroup power are also ordered in ascending order of the powers of the points having the same mapping in the first subgroup then the powers of those points are in ascending order;
and if the points in a fourth subgroup (if used) also are ordered in ascending order of the powers of the points having the same mapping in the first subgroup then their powers are in ascending order;

(viii) the first subgroup of points of each larger constellation having all the points of the first and second subgroups of points of the next smaller constellation and its second subgroup including all the points of the third subgroup of the next smaller constellation;

(ix) the mapping pertaining to each signal subgroup of a larger constellation which contains two subgroups of a smaller constellation and the mapping pertaining to the latter two subgroups being related in that:
the mapping of the fixedly mapped bits in the smaller subgroups is unchanged in the larger subgroup;
the mapping of an additional bit required for the larger constellation is such that, in the first subgroup, a first and second value of that bit causes selection of, respectively, points belonging to first and second subgroup of the smaller constellation and, in the second subgroup, the said first and second values of that bit cause selection of, respectively, points belonging to the fourth and third subgroup of the smaller constellation.

* * * * *